(12) United States Patent
Larson et al.

(10) Patent No.: US 7,086,802 B2
(45) Date of Patent: Aug. 8, 2006

(54) KNUCKLE TO TIE ROD DAMPING SYSTEM

(75) Inventors: Ralph W. Larson, Olivet, MI (US); Thomas Barton, Mattawan, MI (US)

(73) Assignee: Dana Corporation, Toldeo, OH (US)

( * ) Notice: Subject to any disclaimer, the term of this patent is extended or adjusted under 35 U.S.C. 154(b) by 486 days.

(21) Appl. No.: 10/411,438

(22) Filed: Apr. 10, 2003

(65) Prior Publication Data

US 2004/0201193 A1    Oct. 14, 2004

(51) Int. Cl.
*F16C 11/00* (2006.01)
(52) U.S. Cl. ....................... 403/122; 403/144
(58) Field of Classification Search ............ 403/119, 403/122, 127, 132, 133, 135, 137, 227, 253, 403/365, 367, 368, 370; 280/93–511; 267/162
See application file for complete search history.

(56) References Cited

U.S. PATENT DOCUMENTS

| | | | |
|---|---|---|---|
| 2,572,160 A | 10/1951 | Kelly et al. | |
| 2,771,300 A * | 11/1956 | Latzen | 403/133 |
| 3,574,369 A | 4/1971 | Andrew | |
| 3,781,073 A | 12/1973 | Jorn et al. | |
| 4,162,859 A * | 7/1979 | McAfee | 403/122 |
| 4,386,869 A | 6/1983 | Smith | |
| 4,641,855 A | 2/1987 | Izumi | |
| 4,986,689 A | 1/1991 | Drutchas | |
| 5,157,987 A | 10/1992 | Satoh et al. | |
| 5,601,304 A * | 2/1997 | Tilly et al. | |
| 5,765,844 A * | 6/1998 | Wood | |
| 2002/0012567 A1* | 1/2002 | Schmidt | 403/137 |

\* cited by examiner

*Primary Examiner*—Daniel P. Stodola
*Assistant Examiner*—Victor MacArthur
(74) *Attorney, Agent, or Firm*—Dykema Gossett PLLC

(57) ABSTRACT

A steering assembly is provided that incorporates a system for controlled damping of vibration between a steering knuckle and tie rod end. A bushing formed from a damping material is inserted within an aperture formed in a tie rod arm of the steering knuckle. The shank from a ball stud member of a tie rod end is then inserted through the aperture and through a spring washer. The combination of the bushing and spring washer reduces and/or eliminates transmission of vibration from the steering knuckle to the tie rod end.

20 Claims, 1 Drawing Sheet

KNUCKLE TO TIE ROD DAMPING SYSTEM

BACKGROUND OF THE INVENTION

1. Field of the Invention

The present invention relates to a vehicle steering assembly, and more particularly, to a joint formed between a steering knuckle and a tie rod end.

2. Discussion of Related Art

A steering system of a vehicle must perform several important functions that include precise control of the front wheel direction and in some instances the rear wheel direction. The steering system must maintain the correct amount of effort needed to turn the wheels, transmit road feel to the driver's hands, absorb most of the shock going to the steering wheel as the tires hit the road and allow for suspension action.

A conventional steering assembly includes steering knuckles disposed on each side of a vehicle on which one or more vehicle wheels are supported and a steering linkage extending between the two knuckles. The steering linkage typically includes at least a center link, such as a tie rod tube, and two tie rod ends extending from opposite ends of the center link. Each tie rod end defines a socket in which a ball stud member is received. A shank extending from the ball stud member is received within an aperture in a tie rod arm extending from a corresponding knuckle of the steering assembly.

While the vehicle is traveling, vibration from the wheels travels through the steering knuckle, causing the steering linkage to vibrate. Additional vibration is imparted from motion of the vehicle suspension and during braking. Acute vibration over time causes the tie rod ends to become worn and fatigued. A worn or failed tie rod end can cause steering play and damage to the steering assembly. The amount of vibration may be reduced by inserting a damping material in each joint formed between the steering knuckles and the tie rod ends as shown in U.S. Pat. No. 3,781,073.

Although the joint disclosed in U.S. Pat. No. 3,781,073 reduces the amount and types of vibrations transmitted to the steering linkage, the disclosed joint may continue to allow an undesirable level of vibration to be transmitted to the steering linkage. As a result, the tie rod ends and link may still suffer an undesirable amount of wear and fatigue from vibration.

The inventors herein have recognized a need for a steering assembly that that will minimize and/or eliminate one or more of the above-identified deficiencies.

SUMMARY OF THE INVENTION

The present invention provides a steering assembly.

A steering assembly in accordance with the present invention includes a steering knuckle having a body and a tie rod arm extending therefrom and defining an aperture. The steering assembly also includes a tie rod end having a shank extending from a socket. The shank is configured to be received within the aperture in the tie rod arm of the steering knuckle. The steering assembly further includes a bushing formed from a damping material that is disposed within the aperture in the tie rod arm and is in contact with the shank of the tie rod end. Finally, the steering assembly includes a spring washer disposed on one side of the tie rod arm and configured to receive the shank.

A steering assembly in accordance with the present invention is advantageous as compared to conventional steering assembly because the inventive steering assembly minimizes and/or eliminates a greater amount and types of vibration that would otherwise be transmitted to the tie rod end. As a result, wear on the steering linkage is reduced and maintenance costs are lessened.

These and other features and objects of this invention will become apparent to one skilled in the art from the following detailed description and the accompanying drawings illustrating features of this invention by way of example.

DETAILED DESCRIPTION OF EMBODIMENTS OF THE INVENTION

Figure 1:
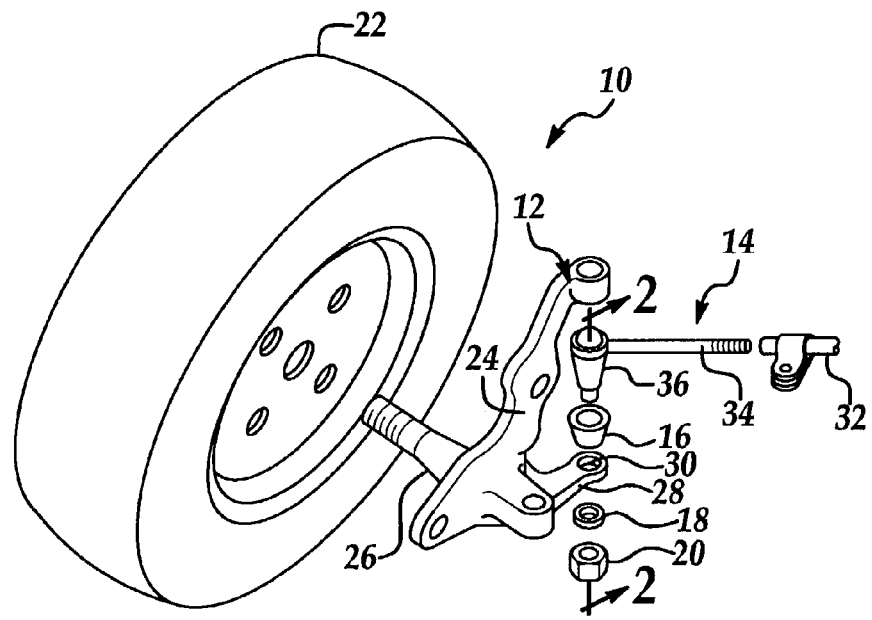
FIG. 1 is an exploded view of a steering assembly in accordance with one embodiment of the present invention.

Referring now to the drawings wherein like reference numerals are used to identify identical components in the various views, FIG. 1 illustrates a steering assembly 10 in accordance with the present invention. It should be understood by those of skill in the art that FIG. 1 illustrates one end of a vehicle steer axle and that similar components as illustrated in FIG. 1 would be found at an opposite end of the steer axle. Assembly 10 is provided for use with heavy trucks. It should be understood, however, that assembly 10 may find use in other vehicles and applications. Assembly 10 may include a steering knuckle 12, a tie rod end 14, a bushing 16, and means, such as spring washer 18 and nut 20, for controlling precompression of bushing 16 between knuckle 12 and tie rod end 14.

Figure 2:
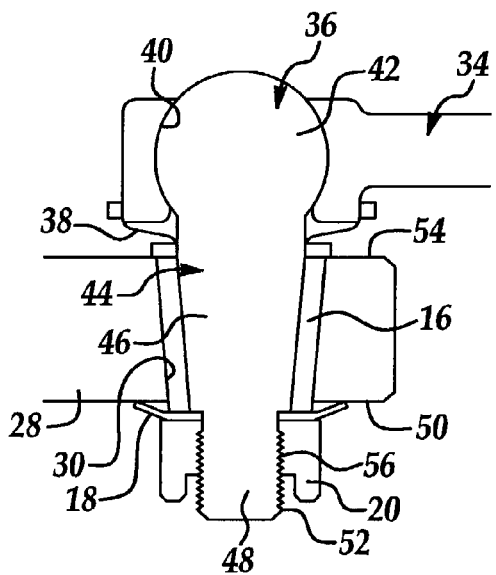
FIG. 2 is a cross-sectional view taken along the line 2—2 of FIG. 1.
Figure 3:
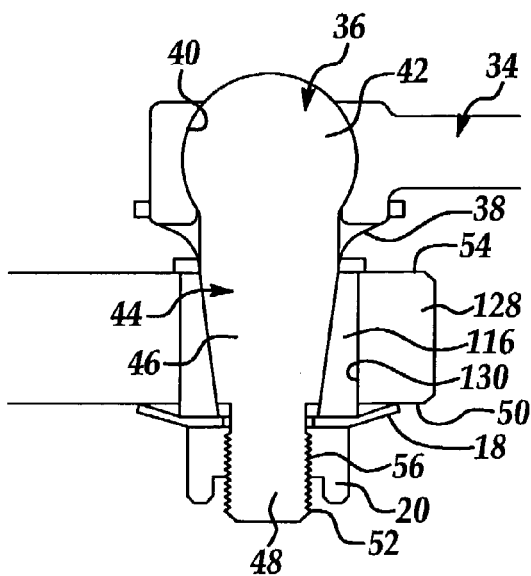
FIG. 3 is a cross-sectional view of a steering assembly in accordance with another embodiment of the present invention.

Knuckle 12 is provided to mount one or more vehicle wheels 22 and is conventional in the art. Knuckle 12 includes a body 24 from which a spindle 26 extends to support one or more wheels 22 and knuckle 12 may be unitary in construction. Knuckle 12 also includes a tie rod arm 28 extending from body 24 to which tie rod end 14 may be connected to link knuckle 12 to another steering knuckle (not shown) on the opposite side of the vehicle. Referring now to FIG. 2, arm 28 defines an aperture 30 proximate to one end. Aperture 30 may extend through arm 28. At least a portion of aperture 30 tapers and aperture 30 may be substantially conical in shape. Referring to FIG. 3, in an alternate embodiment of the invention, a tie rod arm 128 defines an aperture 130 that is substantially cylindrical in shape and does not taper.

Referring again to FIG. 1, tie rod end 14 is provided to couple a steering linkage including center link 32 to knuckle 12. It should be understood that another tie rod end (not shown) may be disposed at the opposite end of center link 32 to connect link 32 to another steering knuckle (not shown) disposed on the other side of the vehicle. End 14 may include a socket member 34 and a ball stud member 36 and a conventional gasket 38 (best shown in FIG. 2). Socket member 34 may be threadably coupled to link 32 and, with reference to FIG. 2, defines a socket 40 at one end configured to receive ball stud member 36. Ball stud member 36 may include a ball portion 42 received within socket 38 and a shank 44 that is integral with ball portion 42 and extends outward from socket 38. Shank 44 may include a tapered portion 46 and a straight portion 48 that forms a shoulder with portion 46. Portion 46 tapers as it extends away from ball portion 40 and is substantially conical in shape. Portion 46 is sized to be received within aperture 30 in tie rod arm 28. Portion 48 extends from conical portion 46 and is disposed on one side 50 of tie rod arm 28 upon assembly of assembly 10. Portion 48 includes a plurality of threads 52 along at least part of portion 48.

Bushing 16 is provided to allow relative rotation between shank 44 of tie rod end 14 and tie rod arm 28 of knuckle 12. Bushing 16 is also provided to reduce vibration transmitted between knuckle 12 and tie rod end 14. Bushing 16 is made from a conventional elastomeric damping material such as a synthetic rubber or a relatively soft plastic. It should be understood that a variety of damping materials could be used, however, and that the composition and thickness of bushing 16 may be varied with the goal of damping the range of excitation of the tie rod end 14. Bushing 16 is sized to be received within aperture 30 in tie rod arm 28 and is further sized to receive portion 46 of shank 44 of tie rod end 14. The location of bushing 16 provides a reduction in both the intensity and frequency of vibrations. Bushing 16 tapers and may be substantially conical in shape in a complementary fashion to aperture 30 and shank 44. As shown in FIG. 2, in one embodiment of the invention both the inner and outer diameters of bushing 16 taper. Referring to FIG. 3, in an alternative embodiment, only the inner diameter of a bushing 116 tapers while the outer diameter of bushing 116 does not taper and instead has a substantially constant diameter that complements the substantially constant diameter of aperture 130 of tie rod arm 128. Referring again to FIG. 2, upon insertion of shank 44 within aperture 30, bushing 16 is in contact with shank 44 of tie rode end 14 and becomes compressed between shank 44 and arm 28 of knuckle 12.

Washer 18 and nut 20 provide a means for controlling precompression of bushing 16 upon assembly of assembly 10. Washer 18 is a spring washer and may comprise a Belleville washer. Washer 18 is disposed on side 50 of arm 28 opposite from the side 54 on which socket member 34 is disposed and is disposed between arm 28 and nut 20. Washer 18 may alternatively be disposed on side 54 of arm 28, however. Washer 18 contacts one end of bushing 16 extending outwardly from aperture 30 in tie rod arm 28 and contacts side 50 of arm 28. Nut 20 may comprise a conventional nut having a plurality of threads 56 configured to engage threads 52 on portion 48 of shank 44. Nut 20 is turned to compress spring washer 18 and thereby control precompression of bushing 16.

The use of a spring washer 18 in combination with bushing 16 provides a significant advantage as compared to conventional steering assemblies. In particular, the combination is effective at reducing and/or eliminating certain types of vibrations that are still transmitted to the tie rod ends in conventional steering assemblies. Further, the combination generally reduces a much greater amount of vibration transmitted to the tie rod ends. The inventive steering assembly has additional advantages as well. The inventive assembly improves load distribution on the socket in the tie rod end. Further, the inventive assembly allows accurate control of precompression of the damping material through washer 18 and nut 20.

While the invention has been particularly shown and described with reference to the preferred embodiments thereof, it is well known by those skilled in the art that various changes and modifications can be made in the invention without departing from the spirit and scope of the invention.

We claim:

1. A steering assembly, comprising:
   a steering knuckle having a body and a tie rod arm extending therefrom, said tie rod arm defining an aperture;
   a tie rod end having a shank extending from a socket, said shank configured to be received within said aperture;
   a bushing formed from a damping material disposed within said aperture in said tie rod arm and in contact with said shank of said tie rod end; and,
   a spring washer disposed on a first side of said tie rod arm and configured to receive said shank.

2. The steering assembly of claim 1 wherein said aperture in said tie rod arm tapers.

3. The steering assembly of claim 2 wherein said aperture is substantially conical in shape.

4. The steering assembly of claim 1 wherein said shank tapers.

5. The steering assembly of claim 4 wherein said shank is substantially conical in shape.

6. The steering assembly of claim 1 wherein said bushing tapers.

7. The steering assembly of claim 6 wherein said bushing is substantially conical in shape.

8. The steering assembly of claim 1 wherein said damping material is generally elastomeric.

9. The steering assembly of claim 1 wherein said bushing is compressed between said steering knuckle and said shank of said tie rod end.

10. The steering assembly of claim 1 wherein said washer comprises a Belleville washer.

11. The steering assembly of claim 1 wherein said socket of said tie rod end is disposed on a second side of said tie rod arm opposite said first side.

12. The steering assembly of claim 1, further comprising a nut disposed about said shank on said first side of said tie rod arm, said spring washer disposed between said nut and said tie rod arm.

13. The steering assembly of claim 1 wherein said bushing is in direct contact with said shank of said tie rod end.

14. A steering assembly, comprising:
   a steering knuckle having a body and a tie rod arm extending therefrom, said tie rod arm defining an aperture extending through said tie rod arm;
   a tie rod end having a shank extending from a socket, said shank configured to be received within and extend through said aperture;
   a bushing formed from a damping material disposed within said aperture in said tie rod arm and in contact with said shank of said tie rod end; and,
   a spring washer disposed on a first side of said tie rod arm opposite from said socket of said tie rod and configured to receive said shank
   wherein said aperture, said shank, and said bushing all taper in a complementary fashion.

15. The steering assembly of claim 14 wherein said aperture, said shank, and said bushing are all substantially conical in shape.

16. The steering assembly of claim 14 wherein said damping material is generally elastomeric.

17. The steering assembly of claim 14 wherein said bushing is compressed between said steering knuckle and said shank of said tie rod end.

18. The steering assembly of claim 14 wherein said washer comprises a Belleville washer.

19. The steering assembly of claim 14, further comprising a nut disposed about said shank on said first side of said tie rod arm, said spring washer disposed between said nut and said tie rod arm.

20. The steering assembly of claim 14 wherein said bushing is in direct contact with said shank of said tie rod end.

* * * * *